June 26, 1945.　　C. A. REIMSCHISSEL　　2,378,951
APPARATUS FOR FORMING SCREW THREADS
Filed June 9, 1943
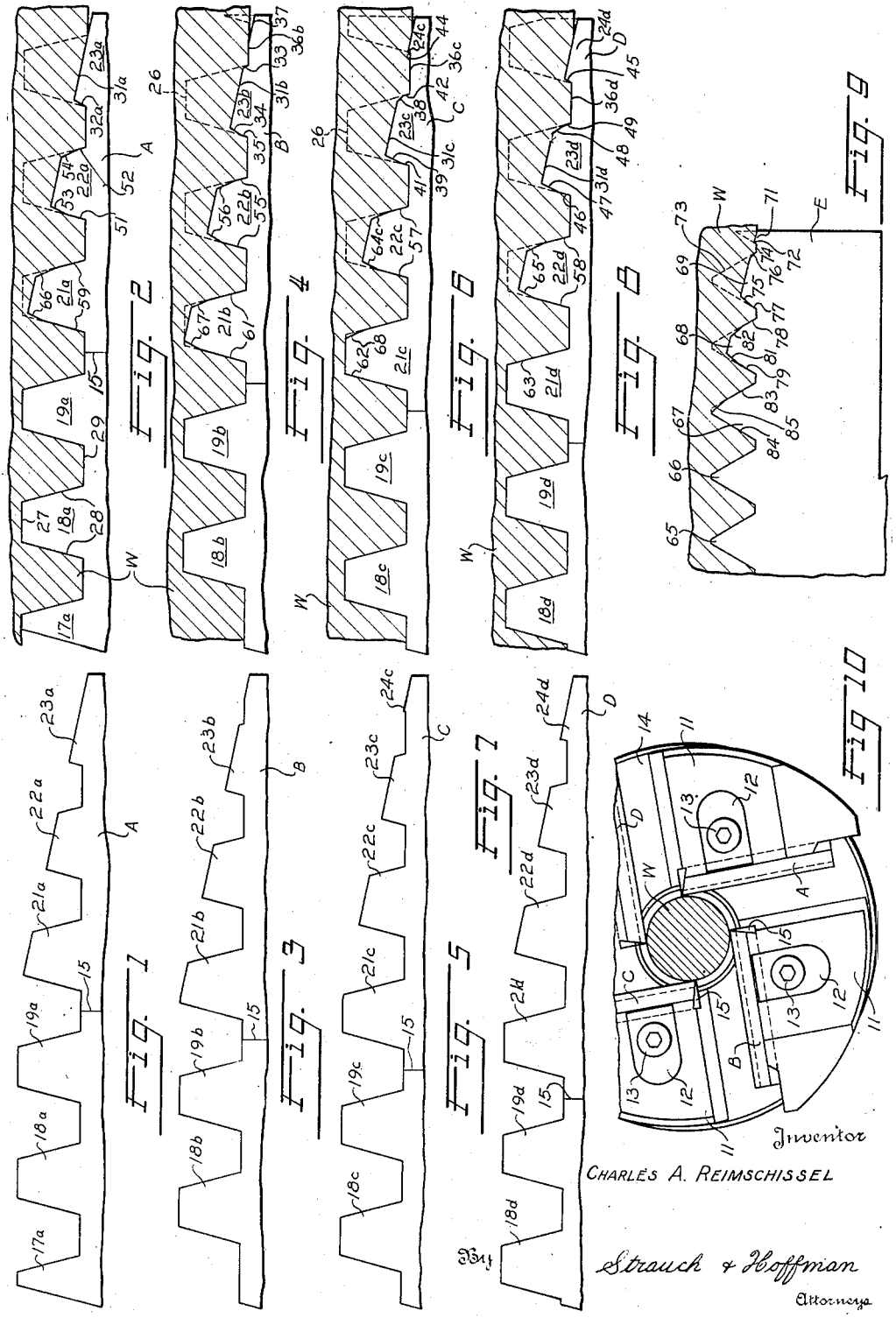
Inventor
CHARLES A. REIMSCHISSEL
By Strauch & Hoffman
Attorneys Patented June 26, 1945

2,378,951

UNITED STATES PATENT OFFICE 2,378,951

APPARATUS FOR FORMING SCREW THREADS

Charles A. Reimschissel, Waynesboro, Pa., assignor to Landis Machine Company, Waynesboro, Pa., a corporation of Pennsylvania Application June 9, 1943, Serial No. 490,204

12 Claims. (Cl. 10—111)

The present invention relates to the manufacture of threaded articles, having either external or internal screw threads, and more particularly to the manufacture of threaded articles in which the thread is formed by successive rough and finish cutting operations.

While it has been heretofore proposed to form a thread by successive cutting steps, these prior methods and apparatus have resulted in threading costs which have been too high to justify their general use, and they have accordingly gone into only limited use in the production of those classes of work that warrant the additional expense and time required by those methods and apparatus. One of the prior methods involves cutting the thread to rough or approximate form with a tap or die, and opening the tap or die to release the work; and then feeding the work through the tap or die a second time, with the chasers adjusted to cut away the slight additional amount of material necessary to bring the thread to final form. Another prior method resides in either rolling or cutting the thread to approximate form and then finishing the the thread in a grinding operation. Both of these methods require two separate time consuming operations, with the result that the cost of threaded articles produced thereby is excessive and this accordingly limits them to very limited fields of use.

I have found that by providing a set of chasers in which certain of the cutting edges are so formed as to cut narrow spaced surfaces on the work, as the helical groove forming the thread is successively deepened, which roughly approximate the form of portions of the side faces of the desired thread, and certain other cutting edges are so formed as to successively cut away the previously roughed-out portions of the work and bring the side faces of the desired thread to finish form; and by locating the cutting edges of the chasers in predetermined relationship to each other, it is possible, in a single continuous threading operation, to cut extremely accurately formed threads, by a rough and finish cut process, requiring no greater production time than the present chaser thread cutting methods. According to the invention, the chasers successively rough-out narrow portions of the side faces of the desired thread, and then subsequently cut away the narrow roughed-out portions to bring the narrow complemented areas into the form of the side walls of the desired thread, with no ridges or grooves between the successive incremental surfaces making up the finished thread.

The invention also achieves a structure in which the cutting is so distributed among the various cutting edges of the chasers that they remain sharp materially longer than the chasers now in use for general threading.

It is accordingly the major object of this invention to provide methods of, and apparatus for, producing threaded articles, in which the side faces of the thread are formed in successive rough and finish cutting operations, as the groove between the side faces of the thread is progressively deepened, in a continuous process, and in which the final thread is made up of a plurality of narrow, parallel incremental or complemental surfaces lying exactly in the planes of the thread side faces.

A further important object is to provide thread cutting chasers having portions which make spaced roughing cuts to bring the side faces of the thread to approximate form, and other portions which simultaneously make finishing cuts in previously roughed-out portions of the side faces of the thread and bring them to final thread form as the groove between the side faces is progressively deepened.

A further object is to provide a novel method of cutting a screw thread, comprising the steps of roughing out certain components of the side faces of the thread and simultaneously finish forming other components of the side faces of the thread and progressively deepening the helical groove between the side faces.

Another object is to provide a novel chaser assembly, in which certain cutting edges of the chasers depart from the thread form by predetermined amounts, to rough-out certain components of the side faces of the thread as the helical groove between the side faces is deepened, and in which other cutting edges conform to the desired thread form and are designed to simultaneously finish form other components of the thread side faces.

A further object is to provide apparatus for forming a screw thread in a continuous operation and operable to progressively deepen the helical groove between the side faces of the thread and to continuously rough form the sides of the groove in advance of finish forming the sides, and to then subsequently perform finish forming steps on the rough-formed portions of the sides and bring the sides of the thread into final form.

Further objects will become apparent as the specification proceeds in conjunction with the annexed drawing, and from the appended claims.

In the drawing:

Figures 1, 3, 5, and 7 are fragmental end elevational views of a set of chasers of the invention, as they appear before being formed to final shape.

Figures 2, 4, 6, and 8 are fragmental end elevational views of the chasers shown in Figures 1, 3, 5, and 7, respectively, as they appear after being ground or formed to final shape and in the process of cutting a thread on a work piece.

Figure 9 is a view similar to Figure 8, but illustrates a chaser having a slightly modified profile for cutting a somewhat different type of thread; and Figure 10 is a fragmental front elevational view of a die head having a set of chasers, made in accordance with the invention, installed therein.

With continued reference to the drawing, wherein like reference characters have been employed to designate similar parts throughout the several views thereof, and referring first to Figure 10, wherein the invention has been illustrated as embodied in a set of tangential chasers for a die head, the chasers have been designated A, B, C, and D, and they are each rigidly supported in a holder 11 by means of a clamp assembly 12 and a clamp screw 13, it being understood that the guideways in the holders 11 are so inclined that the cutting edges of the chasers can accurately follow the lead of the thread being cut on the work.

The holders are supported on a head 14 for either radial or pivotal inward and outward movement, for varying the diametrical size of the head in well-known manner, to adapt the head and chaser assembly to various diameters of work, the latter being designated by the letter W. The inner end of each chaser is provided with a cut-away portion 15, to afford the desired rake angle, which will vary in accordance with the material being threaded, as is well understood in the art. Either the die head or the work is mounted for rotation and for feeding movement, for relatively rotating the chasers and work, and feeding them towards each other relatively, to introduce the work into the chasers, in well known manner (not shown).

While I have illustrated the invention as being applied to a straight tangential chaser for a die head, it is to be understood that the invention is not limited thereto and may be embodied in circular or radial chasers, and also may be incorporated in taps, for cutting an internal thread in a work piece, such as a pipe or the like, and the appended claims are intended to embrace the invention when it assumes these forms.

Referring now to Figures 1, 3, 5, and 7, which illustrate the four chasers of the set in an intermediate stage of manufacture, before they are given their final profile, these figures may also be regarded as illustrative of the prior art type chaser now in wide use for thread cutting. Chaser A is provided with nut action rib-like projections or serrations 17a, 18a, and 19a, and similar nut action serrations on chasers B, C, and D have been given the same reference characters with the subscripts b, c, and d, for simplicity. These serrations merely function to exert a final smoothing action upon the completed thread and also function as a nut and manifest a lead screw action to positively feed the work into the chasers, as is readily understood in the art, it being observed that serration 17a only appears on chaser A, it being omitted from chasers B, C and D in view of the fact that the inner ends of the chasers are disposed in the helical path defined by the thread being cut.

Referring to Figure 1, chaser A is provided with a plurality of serrations for cutting the thread, the tops of the serrations being inclined at the desired throat angle, so that as the work is fed into the chasers the stock will first be cut down to proper size by throat serration 23a, and the groove between the thread side faces will then be successively cut deeper into the stock by the cutting edges of additional serrations 22a and 21a respectively. The corresponding serrations of chasers B, C, and D have been given the same reference character with the subscripts b, c, and d respectively, in order to simplify the disclosure, it being observed that chaser C, the first chaser to cut the actual helical groove which will ultimately terminate as the finished screw thread, is provided with an additional serration 24c and that the following chaser, chaser D, has a similar serration 24d which enlarges that helical groove preparatory to further enlargement by serrations 23a through 23d, etc., serration 21d finishing the helical groove to full depth.

As will be understood by those skilled in the art, the chasers A, B, C, and D, when they are in the form illustrated in Figures 1, 3, 5, and 7, may be installed in the die head of Figure 10 and a screw thread cut upon the work piece by rotating them relatively and feeding the work into the chasers. However, the thread produced would be the result of each of the cutting edges of the several serrations 24 to 21, inclusive, cutting a part of the final thread directly to finished form, with no rough and finish cut operations in between.

I have found that by shaping the cutting edges of the chaser as shown in Figures 2, 4, 6, and 8, it is possible, in a single threading operation, to both rough and finish form the desired thread by a novel method, in which certain cutting edges of the chaser serrations perform a roughing operation upon the side faces of the thread as the helical groove between the thread side faces is being progressively deepened, while other portions of the cutting edges of the serrations perform finish cutting operations upon the previously roughed-out portions and bring the side faces of the thread into desired form accurately and without requiring the expenditure of any more time than that required in a conventional threading operation. The manner in which the novel method is carried out and the apparatus employed for performing it will now be described.

Referring to Figures 2, 4, 6, and 8, the chasers are shown in the process of threading a piece of work. The portions of the completed thread, and also the dotted lines which show the contour of the thread yet incompletely cut by the chasers, are designated by the reference character 26.

The particular thread illustrated is of the Acme type, having a root 27, side faces 28, and a crest 29, although it is to be understood that the invention is not limited to the production of any particular type of tooth, as V-shaped, square, or other shaped threads may be formed in accordance with the methods and apparatus of the invention on cylinders or cones.

The chasers of Figures 2, 4, 6, and 8 may be formed by grinding off certain of the serrations of the chasers illustrated in Figures 1, 3, 5, and 7, respectively, to depart, by predetermined amounts, from the final thread form or, if desired, the chasers may be brought to the form illustrated in Figures 2, 4, 6, and 8 in the first instance, without going through the intermediate stage of producing chasers having the form of Figures 1, 3, 5, and 7, but the latter method has been illustrated in order to clearly bring out the differences between the novel method and apparatus and the prior art.

Taking up the cutting edges in the order in which they generate the thread upon the work, the right-hand portion of top face 31a of serration 23a serves to reduce the work or stock to the proper size if it is larger than the desired overall diameter of the crest of the thread to be cut, and also cuts away a portion of the helical groove between the side faces of the threads. Similar reference character 31, with the subscripts b, c, and d, respectively, has been applied to the corresponding serrations of chasers B, C, and D, it being noted that they are progressively higher and cut a deeper groove between the adjacent convolutions of the thread to be formed.

With continued reference to Figure 2, it will be observed that the side face 32a of serration 23a deviates from outline 26 of the finished or desired thread form, and thereby performs a roughing operation. The surface thus formed on the work is cut away in a subsequent finish cutting operation, as will be hereinafter described.

Referring now to Figure 4, serration 23b is provided with side cutting edges 33 and 34, which deviate from thread outline 26, and accordingly rough-out portions of the thread side faces. Serration 23b is also provided with a side cutting edge 35, which, as seen in Figure 2, directly coincides with the tooth form and therefore performs a finish cutting or forming operation upon the thread surface previously roughed-out by cutting edge 32a of chaser A. While edges 33, 34, and 35 are cutting the side faces of the thread as just described, top edge 31b deepens the groove between the thread side faces.

Chaser B is also provided with a cutting edge 36b, and chasers C and D are provided with similar cutting edges 36c and 36d, respectively, for forming the crest of the thread. A tapered surface 37 on chaser B serves to reduce the stock to size.

Referring to Figure 6, serration 23c has side cutting edges 38 and 39, operable to take deeper roughing cuts in the work, and also a surface 41 which coincides with tooth profile 26, and being wider than surface 35 of serration 23b takes a finishing cut on a portion of work previously roughed-out by rough cutting surface 34. A short cutting edge 42 similarly finish forms a portion of the side face roughed-out by edge 33 of chaser B.

Additional serration 24c on chaser C functions primarily as a taper cutting tool. However, as seen in Figure 6, it is also provided with a short side cutting face 44 operable to initially rough-out a narrow portion of the side wall of the thread.

Referring to Figure 8, serration 24d has a top cutting edge for reducing the stock to size and also a side cutting edge 45, which rough forms a portion of the side wall of the thread, because as seen in Figure 8, it deviates from thread profile 26, so as to merely take a roughing cut subsequent to that of side cutting face 44 on chaser C but prior to that of side face 32a of chaser A. Chaser D is also provided with a cutting edge 36d for cutting the crest of the thread. Serration 23d of chaser D is provided with a top cutting edge 31d for deepening the groove in the stock between the thread side faces but is also provided with two pairs of side cutting edges. At one side of the serration is a cutting edge 46 conforming to the shape of the thread profile 26 and operable to finish a portion of the thread roughed out by cutting edge 39 of chaser C. An adjoining cutting edge 47 on chaser D roughs out an additional portion of the side wall.

The other side of serration 23d is provided with a roughing edge 48, and a narrow finishing cutting edge 49, for finishing a portion of the thread roughed-out by edge 38 of chaser C. Chaser A immediately follows chaser D (by 90°), with the result that the cutting edges of serration 22a next act upon the portions of the thread cut by the cutting edges of serration 23d. Serration 22a is accordingly provided with side finishing edges 51 and 52, for finishing portions of the thread roughed-out by cutting edges 47 and 48 of serration 23d. Serration 22a is also provided with side cutting edges 53 and 54 for further roughing out the thread side wall.

Serration 22b of chaser B immediately follows serration 22a and is provided with a pair of side cutting edges 55, for finishing portions of the thread roughed-out by side cutting edges 53 and 54, and also has a pair of roughing cut edges 56 for roughing out further portions of the side face of the thread.

Serrations 22c, 22d, 21a, 21b, 21c, and 21d next act upon the thread in that order, and they are provided with finish cutting edges 57, 58, 59, 61, 62, and 63, and serrations 22c, 22d, 21a, 21b and 21c are provided with roughing edges 64, 65, 66, 67, and 68, it being observed that the finish cutting edges cut away the portions of the side walls roughed-out by the rough cutting edges, and that cutting edge 63 of chaser D finishes the last roughed out portion of the thread.

The thread is accordingly formed on the work in a plurality of successive rough and finish cutting operations, it being observed that, with the exception of the extremely short side cutting surfaces 44, 45, 32a, and 33, each of the roughing surfaces is located immediately adjacent a finish cutting surface, so that each serration provides cutting edges which simultaneously rough-out a part of the side faces of the thread, and finish a portion of the side faces of the thread previously roughed-out by a cutting edge on the preceding chaser.

While I have illustrated the invention as being applied to a set of four chasers, it is to be understood that, if desired, the number of chasers in the set may be increased or decreased, and the rough and finish cutting surfaces modified accordingly, without departing from the spirit of the invention. Also, the relative lengths of the rough and finish cutting edges may be varied within limits, but they are preferably so proportioned, with respect to all of the other pairs of cutting edges in the set, as to divide the cutting load substantially equally among all of the surfaces, so as to avoid overloading any of the cutting edges and insuring long life of the cutting edges before resharpening is necessary.

As previously pointed out, the invention is also applicable to cutting threads of other than the Acme type shown, and in Figure 9 there is illustrated a chaser E for cutting an American National thread. With continued reference to Figure 9, the chaser designated E, of a four chaser set, is provided with a pair of nut action serrations 65 and 66, and four thread cutting serrations 67, 68, 69, and 71, the latter functioning primarily as a taper tool for reducing the stock to size, but it is also provided with a short side cutting edge 72, for making a rough cut in the sides of the thread, the profile of the latter being designated by reference character 73. Intermediate serrations 69–71 is a cutting edge 74 for forming the crest of the thread.

Serration 69 is provided with two rough cutting side edges 75 and 76, and a finish cutting side edge 77. Serration 68 has a finish side cutting edge 78 for finishing a portion of the thread roughed-out by surface 76, and a finish cutting side edge 79, for finishing a portion of the thread roughed-out by surface 75 of serration 69. Also provided on serration 68 are rough cutting side edges 81 and 82, for roughing-out further portions of the side face of the thread. Serration 67 is provided with finish cutting edges 83 and 84, for finishing portions of the thread roughed-out by surfaces 82 and 81, respectively, and also is provided with a rough cutting edge 85 for roughing-out a final portion of the thread side face, the chaser having a finish cutting edge which finishes the portion of the thread roughed-out by cutting edge 85 not being illustrated, it being understood that the chaser E forms one of a set of four chasers, and that the thread is developed by successive rough and finish cutting operations in a manner substantially the same as the one previously discussed.

It is accordingly apparent from the foregoing detailed disclosure of the invention that I have provided a novel method of and apparatus for cutting a thread in a work piece, in which the chasers progressively deepen the helical groove between the side faces of the thread and simultaneously rough-out portions of the side faces, and finish form other portions of the side faces, the rough and finish cutting steps being carried out successively, so that, when the operation is completed, an extremely accurate thread will be formed, in a single, continuous process, which requires no greater time than the methods in present day use.

While I have disclosed a method of and apparatus for forming screw threads by cutting them with a set of chasers, it is to be understood that the method of the invention may also be carried out in a thread rolling device having rotatable thread rolling dies so shaped as to have the general profile of the chasers illustrated, so as to cause the dies to first roll the thread to rough form and finally roll it to final form, without departing from the spirit of the invention. Similarly, forming means other than cutting or rolling may utilize devices which incorporate the spirit of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a device for cutitng a screw thread in a work piece, a cutting tool adapted to be rotated relatively to the work piece, said tool having a plurality of thread cutting elements, each of which embodies a primary cutting edge operable to rough-out one portion of the side of the screw thread and secondary cutting edge operable to finish form another portion of the side of the thread when the tool and work piece are rotated relatively, at least one of said elements being provided with a pair of primary cutting surfaces operable to rough-out portions of the two side faces of the thread; a cutting edge for cutting the bottom of the helical groove between the side faces of the thread; and a pair of secondary cutting edges operable to finish form other portions of the two side faces of the thread.

2. The threading device defined in claim 1, together with a second tool adapted to be mounted in cooperative relationship with said first tool and having cutting edges operable to finish form the portions of the side faces of the thread roughed-out by the primary cutting edges of said first tool.

3. In a device for cutting screw threads on work pieces, a cutter structure; said cutter structure being adapted to be mounted for relative rotation with respect to a work piece; a plurality of rough-forming cutting edges and a plurality of finish-forming cutting edges on said structure, said cutting edges being so disposed with respect to each other that said rough-forming edges will cut narrow surfaces on the work piece approximately to the shape of the sides of the thread but inclined with respect thereto, and said finish-forming cutting edges will cut away the narrow surfaces and bring the sides of the thread to final form when said structure and work are relatively rotated, and a plurality of root cutting surfaces on said structure for progressively deepening the root of the thread during formation of the sides of the thread.

4. The thread cutting device defined in claim 3, wherein said cutting edges are divided into a plurality of circumferentially spaced groups, and each group is made up of several rough-forming cutting edges and several finish-forming cutting edges, with a finish-forming cutting edge of each group so disposed as to follow a rough-forming cutting edge of another group.

5. A device for cutting a screw thread in a work piece, comprising a plurality of thread-cutting chasers adapted to be mounted on a head and relatively rotated with respect to a work piece; each chaser being provided with a plurality of thread cutting projections on one side face thereof and adapted to have their ends disposed in helical paths corresponding to the helix of the thread to be cut; a serration on one of said chasers having a primary cutting edge operable to rough-out one portion of the screw thread side face and a secondary cutting edge operable to simultaneously finish form a second portion of the screw thread face; a serration on an adjacent chaser lying in the same helical path as said first-named serration and having a primary cutting edge operable to rough-out a third portion of the thread and a secondary cutting edge operable to simultaneously finish form the first-named portion of said screw thread side face when said head and work piece are relatively rotated.

6. The threading device defined in claim 5, wherein each of the remaining chasers is provided with a serration corresponding to, and lying in the same helical path as said serration on said one chaser and having primary and secondary cutting edges for successively roughing-out and finish-forming adjacent portions of the side faces of said screw thread.

7. A thread cutting chaser, comprising a body having a plurality of parallel rib-like projections on one face thereof terminating at one end of the chaser in cutting edges, at least one of said projections having a thread side face cutting edge departing from the form of the thread to be cut and operable to make a narrow roughing-cut in the work piece to be threaded, and a second thread side face cutting edge disposed adjacent the first-named cutting edge and conforming to the form of the thread to be cut and operable to make a narrow finishing cut in the work piece and form a portion of the final thread adjacent the roughing cut produced by said first named cutting edge.

8. The chaser defined in claim 7, wherein another of said projections is provided with a pair of spaced thread side face cutting edges departing from the form of thread to be cut disposed on opposite sides of the projection and operable to make a pair of narrow roughing cuts in the work piece to be threaded, and a second and a third thread side face cutting edge disposed adjacent said pair of cutting edges respectively and conforming to the form of the thread to be cut and operable to make a pair of narrow finishing cuts in the work piece and accurately form portions of opposite sides of the final thread.

9. In a threading device, a chaser comprising a body having a plurality of parallel projections, which terminate in thread forming cutting edges, said projections comprising a projection adjacent one side edge of the chaser body having an inclined top, for reducing the stock to proper size; a plurality of nut action projections adjacent the other side edge of the chaser body each having a shape corresponding exactly to the form of the thread to be cut for exerting a lead screw action upon the work during threading; and a plurality of thread forming projections disposed intermediate said first and second-named projections and so formed to be of increasingly greater heights in a direction toward said nut action projections, so as to progressively deepen the helical groove between adjacent convolutions of the thread, the side faces of each of said thread-forming projections being made up of a surface departing materially from the shape of the side face of the thread to be cut, to provide a pair of thread side face rough-cutting edges, and a surface conforming to the side face of the thread to be cut, to provide a pair of thread side face finish-cutting edges, said rough and finish-cutting edges being stepped increasingly greater distances outwardly from the chaser body in a direction toward said nut action projections, for successively rough and finish-forming portions of the side face of the thread.

10. The chaser defined in claim 9, wherein said surfaces of said projections which conform to the side face of the thread are disposed adjacent the bases of the projections, inwardly of said surfaces which depart materially from the side face of the thread, and join the latter at an obtuse angle.

11. A thread cutting chaser having serrations on one of its faces, one group of serrations terminating at one end of said chaser in thread cutting edges and another group of said serrrations terminating at said one end of said chaser in lead screw action portions; each of said cutting edges comprising a throat portion, designed to cut the helical groove defining the root of the thread, and a side cutting portion for cutting the side wall of the thread, disposed on either side of said root cutting portion, certain of said side cutting portions joining their throat portions along cutting edges which depart from the plane of the side wall of the final thread to be formed, to thereby leave generally wedge-shaped bodies of material on the work piece adjacent the corners joining said throat and side wall cutting portions, to be successively removed by said side cutting portions as the groove in the work piece is progressively deepened by said throat cutting portions.

12. The thread cutting chaser defined in claim 11, wherein each of said side cutting portions comprises a part conforming exactly to the shape of the final side wall of the thread to be cut and a part inclined with respect to said first part and meeting said throat cutting edge at a corner which is disposed inwardly from the final thread side wall.

CHARLES A. REIMSCHISSEL.